3,395,172
CONTINUOUS PRODUCTION OF ETHYLENE
CYANOHYDRIN
Walter Schweter, Mannheim, Germany, assignor to Badische Anilin- & Soda-Fabrik Aktiengesellschaft, Ludwigshafen (Rhine), Germany
No Drawing. Filed July 27, 1965, Ser. No. 476,779
Claims priority, application Germany, Aug. 1, 1964, B 77,930
2 Claims. (Cl. 260—465.6)

ABSTRACT OF THE DISCLOSURE

Production of ethylene cyanohydrin by liquid phase reaction of hydrocyanic acid and ethylene oxide under high turbulence in closed circulation system.

---

This invention relates to the continuous production of ethylene cyanohydrin from hydrocyanic acid and ethylene oxide. More particularly it relates to the use of these reactants in the liquid phase and to the use of a tubular circulation system through which the reaction mixture is circulated under turbulence conditions at pH values of at least 8.5 and at pressures of at least 2 atmospheres gauge.

It is known that hydrocyanic acid will add on to oxo compounds or epoxides with the formation of cyanohydrins. In many cases this reaction may be accelerated by adding catalytic substances; for example adding on to ketones and epoxides is commonly carried out in alkaline medium, the catalyst used being an alkali metal or alkaline earth metal hydroxide, an amine, a basic salt or a substance which reacts similarly. Thus for example ethylene cyanohydrin may be prepared according to U.S. patent specification No. 2,390,519 at 90° C. to 150° C., the reaction commencing suddenly and proceeding rapidly, an explosive course of the reaction not always being avoidable; see Table I on page 2 of the said specification. Moreover the yields are unsatisfactory at temperatures of more than 70° C. because a large proportion of the initial materials is reacted to form byproducts. On the other hand the throughputs and space-time yields achieved at lower temperatures are only small (see for example French patent specification No. 1,089,541). The production of cyanohydrins, for example of acetaldehyde, crotonaldehyde and acetone, in an open circulatory system at temperatures of from 5° C. to 20° C. and pH values of up to 8.0 is described in British patent specification No. 892,781.

Having regard to this, it is very surprising to find that ethylene cyanohydrin can be obtained very advantageously, while avoiding the risk of explosions, from liquid ethylene oxide and liquid hydrocyanic acid in an alkaline medium by circulating the reactants in a closed tubular circulation system and by discharging the reaction product into a secondary reactor by working under turbulence conditions, by maintaining a pH value of more than 8.5, by maintaining a pressure of at least 1 atmosphere gauge, and by maintaining a temperature, within the range of 20° C. to 100° C., which does not differ by more than 5° C. during the whole course of the reaction.

The initial materials for the new process, namely ethylene oxide and hydrocyanic acid, are introduced in liquid phase into a closed circulatory system consisting wholly or substantially of tubes or tube bundles which are advantageously capable of being cooled. The use of a small excess of hydrocyanic acid, i.e. a molar ratio of from 1:1 to 1:1.5, especially from 1:1 to 1.1 may be advantageous; a large excess of one of the reactants is, of course, disadvantageous. A large excess of the reaction product (with reference to the amount of initial materials), for example of the order of several hundred times, may be circulated in the circulatory system by means of a pump (for example a centrifugal pump, especially a pump without a stuffing box may be used) at such a velocity that at the given cross-section of the tubes or tube bundles used, the limiting condition of turbulence, i.e. the equation:

$$Re = \frac{w \cdot d}{\gamma} > \simeq 2,000$$

(in which Re is the Reynolds' number, $w$ is the flow velocity, $d$ is the diameter of the tube and $\gamma$ is the kinematic viscosity of the liquid medium) is at least fulfilled. Naturally, the more the turbulence is increased beyond the said limiting condition, either by increasing the velocity of circulation or by decreasing the internal width of the tubes, the higher the reaction speed and the rate at which the heat of reaction is removed, and consequently the greater the guarantee that the overall temperature will vary only within narrow limits and local overheating will be avoided, and in particular the higher the throughput and the space-time yield.

The alkalies used in the new process may be all substances which contain hydroxyl ions or form them during the reaction, particularly inorganic alkalies, such as alkali metal hydroxides, alkaline earth metal hydroxides, alkali metal carbonates, alkaline earth metal carbonates, but also organic substances having an alkaline reaction of a great variety of types, such as primary, secondary or tertiary monoamines or polyamines or quaternary ammonium compounds. They are used advantageously in liquid form, i.e. in aqueous solution or if desired in organic solvents which are inert under the reaction conditions, and in amounts sufficient to maintain a pH value of more than 8.5, advantageously 9 to 13, which can be monitored by means of measuring equipment. A particularly thorough and rapid mixing of the initial materials and the catalyst may naturally be achieved when they are added at a point in the cycle which is ahead of (i.e. on the suction side of) the pump. As already stated it is advantageous for the achievement of high yields to withdraw the heat of reaction by cooling; cooling jackets surrounding the tubes or tube bundles are suitable for example. Particularly good results are achieved by means of a coolant circulation system which is regulated to provide a very simple temperature regulation in the reactor itself. The tubes and the cooling jacket may if desired be in coiled form.

Owing to the closed character of the tubular system used in accordance with this invention, it is possible and, to avoid losses by escape of gas, necessary to use superatmospheric pressure, which may reach considerable values without risk; in general however even a slight superatmospheric pressure in the range of 1 to 10 atmospheres gauge, particularly 2 to 6 atmospheres gauge, which is above the vapor pressure of the reaction mixture and which can be realized relatively easily, is advantageous for the reaction.

The crude reaction product which, owing to the rapid reaction achieved according to the new process, consists predominantly of the desired ethylene cyanohydrin, is withdrawn from circulation in an amount equivalent to the total amount of reactants added. Withdrawal is effected not too far ahead of the point or points at which supply of the reactants and catalyst is effected. A discharge valve controlled by the existing pressure is necessary for this purpose so that the pressure in the circulatory system remains constant. After having been withdrawn, the crude product passes into a secondary reaction zone in which unreacted remainders of initial materials may react with each other with the development of small amounts of heat which if necessary may be withdrawn via inserted cooling coils. The product thus obtained is worked up by conventional methods, for example by neutralization with acids and distillation under subatmospheric pressure.

The ethylene cyanohydrin is thus obtained in a form in which it is suitable and in particular pure enough for all purposes in question, and in outstanding space-time yields which are up to twenty times higher than those hitherto achieved, without any decline in the high yields hitherto obtained. It is surprising that the combination of the measures used in the new process should lead to this excellent result; in particular the fact that it is possible to use such high pH values successfully could not have been deduced from the state of the prior art.

The invention is further illustrated by the following examples. The parts specified in the examples are parts by weight unless otherwise stated; parts by volume bear the same relation to parts by weight as the liter to the gram.

Example 1

8,400 parts of hydrocyanic acid and 13,200 parts of ethylene oxide are circulated per hour in a tubular reactor having a tube diameter of 50 mm. by means of a centrifugal pump without a stuffing box; both reactants are liquid (temperature −20° C.) and are under a nitrogen pressure of 3 atmospheres gauge. The temperature in the reactor is regulated to 57.1° C. by means of the amount of coolant at 20° C. which is circulated, and a pressure of about 2.5 atmospheres gauge is maintained in the reactor; this pressure is higher than the partial pressure of ethylene oxide and hydrocyanic acid in the reaction mixture. With a pump output of 8,000 parts by volume of reaction mixture per hour, the velocity of the liquid in the reactor is 1.1 meters per second. 3 parts by volume of a solution of 4 parts of sodium hydroxide and 10 parts of diethylamine in 100 parts of water is also added per hour as a catalyst, the pH value in the reaction mixture thus being kept at 9.5; it is monitored by a measuring equipment. About 25,000 parts of reaction product per hour is discharged per hour through a constant-pressure valve into a secondary reactor which contains about 12% by weight of water and 3 to 5% by weight of unreacted initial material. After having remained in the secondary reactor for about one hour, ethylene cyanohydrin which, besides water and dissolved catalyst, contains only traces of hydrocyanic acid, is obtained in a yield of 96 to 97% of the theory with reference to ethylene oxide. This product is acidified with sulfuric acid to a pH value of 4.0 and then distilled by means of a short column in vacuo (boiling point 120° C. at 20 mm. Hg). Ethylene cyanohydrin having a water content of up to 2 to 3% is obtained in a yield of 93 to 94% of the theory with reference to the initial components. The space-time yield, with reference to pure ethylene cyanohydrin, is 13 parts per part by volume of the reaction space per day.

Example 2

22 parts of ethylene oxide and 13.6 parts of hydrocyanic acid are reacted in the apparatus described in Example 1 per hour in the presence of 0.5 part by volume of diethylamine at a pH value of 9.2 and a temperature of 65° C. The hourly discharge is 36.1 parts of crude ethylene cyanohydrin having a content of hydrocyanic acid of about 0.1% by weight. Distillation gives 33.6 parts of pure product per hour, equivalent to a yield of 93.0% of the theory with reference to ethylene oxide or hydrocyanic acid. The space-time yield in this case is 19.5 parts of ethylene cyanohydrin per part by volume of reaction space per day.

I claim:

1. In a process for continuous production of ethylene cyanohydrin from liquid ethylene oxide and liquid hydrocyanic acid in an alkaline medium in a circulation system with discharge of the reaction product from a primary reaction zone into a secondary reaction zone, the improvement which comprises carrying out the reaction in a closed circulation system under turbulence conditions wherein the Reynolds number is at least 2,000, at a pressure of one to ten atmospheres gauge, a pH of 9–13, and at a temperature in the range of 20–100° C., which temperature does not vary more than 5° C. throughout the first reaction zone.

2. A process as claimed in claim 1, wherein said pressure is two to six atmospheres gauge.

References Cited

UNITED STATES PATENTS 2,453,062  11/1948  Carpenter _____ 260—465.6

JOSEPH P. BRUST, *Primary Examiner.*